US007391390B2

(12) United States Patent
Son

(10) Patent No.: US 7,391,390 B2
(45) Date of Patent: Jun. 24, 2008

(54) PLASMA DISPLAY PANEL DRIVING METHOD AND DEVICE

(75) Inventor: Jin-Boo Son, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 620 days.

(21) Appl. No.: 10/957,589

(22) Filed: Oct. 5, 2004

(65) Prior Publication Data

US 2005/0083255 A1 Apr. 21, 2005

(30) Foreign Application Priority Data

Oct. 16, 2003 (KR) ...................... 10-2003-0072360

(51) Int. Cl.
*G09G 3/28* (2006.01)
*G09G 5/00* (2006.01)
*G09G 3/10* (2006.01)
*G06F 3/038* (2006.01)

(52) U.S. Cl. ....................... 345/60; 315/169.4; 345/204; 345/214

(58) Field of Classification Search .................... 345/60
See application file for complete search history.

(56) References Cited

U.S. PATENT DOCUMENTS 6,496,165 B1 * 12/2002 Ide et al. ........................ 345/60
7,136,032 B2 * 11/2006 Onozawa et al. .............. 345/60
2001/0005190 A1 6/2001 Furutani

FOREIGN PATENT DOCUMENTS

JP 10-171403 6/1998
JP 10171403 A * 6/1998
JP 10-228259 8/1998
JP 11-190984 7/1999
JP 2000-194317 7/2000
JP 2001-228821 8/2001
JP 2001-265279 9/2001
JP 2002-244613 8/2002
JP 2002-311889 10/2002

(Continued)

OTHER PUBLICATIONS

Computer generated English translation of JP Patent No. 10171403A to Masuchi et al.*

*Primary Examiner*—Sumati Lefkowitz
*Assistant Examiner*—Alexander S. Beck
(74) *Attorney, Agent, or Firm*—H.C. Park & Associates, PLC

(57) ABSTRACT

An improved plasma display panel (PDP) having decreased background brightness, decreased power consumption, and improved contrast includes an address electrode, and a scan electrode and a sustain electrode are arranged in pairs with the address electrode. The PDP driver includes a subfield data generator that generates subfield data from input image data. An address data driver is provided for applying to the address electrode a voltage that corresponds to the subfield data. An address data determiner included in the PDP driver detects a subfield which has no address data from among the subfield data, and outputs a control signal that controls a reset operation of the detected subfield. In response, a scan/sustain pulse driver applies to the scan electrode and the sustain electrode a voltage that corresponds to the control signal provided by the address data determiner.

11 Claims, 5 Drawing Sheets

FOREIGN PATENT DOCUMENTS

| | | |
|---|---|---|
| JP | 2002-366094 | 12/2002 |
| JP | 1389841 | 1/2003 |
| JP | 2003-3066900 | 3/2003 |
| JP | 2003-108063 | 4/2003 |
| JP | 2003-122300 | 4/2003 |
| JP | 2003-177704 | 6/2003 |
| JP | 2003-295817 | 10/2003 |
| KR | 10-2000-0053573 | 8/2000 |

* cited by examiner

PLASMA DISPLAY PANEL DRIVING METHOD AND DEVICE

CROSS REFERENCE TO RELATED APPLICATION

This application claims priority of Korea Patent Application No. 2003-72360 filed on Oct. 16, 2003 in the Korean Intellectual Property Office, which is herein incorporated by reference.

BACKGROUND OF THE INVENTION

1. Field of the Invention

The claimed invention relates to plasma display panels (PDPs) generally. More specifically, the invention relates to a method of driving a PDP and to a device for reducing the power consumption of a PDP and improving its contrast.

2. Description of the Related Art

A PDP is a display device that utilizes a plasma phenomenon to create and display color images. Each PDP includes millions of discharge cells. Each discharge cell is defined by barrier ribs formed between an upper substrate and a lower substrate. A dielectric layer is formed on each of the upper substrate and the lower substrate, and crossed electrodes intersect each discharge cell.

The interior of each discharge cell contains a gas in a vacuum state and is lined with a substance that emits visible colors of light when stimulated by ultraviolet radiation. Sustain electrodes (or X electrodes) and scan electrodes (or Y electrodes) are mounted on the upper substrate, and address electrodes are mounted on the lower substrate. In use, a voltage difference applied to the intersecting electrodes excites the gas atoms to release photons which impinge a colored phosphor that lines the interior of the discharge cell. The phosphor absorbs the incident photon and emits visible colored light. By selectively activating various combinations of electrodes, color images may be created.

In the conventional PDP described above, a drive voltage is supplied to the address electrodes and the scan electrodes to thereby affect an address discharge between the same. Wall charges are formed on the dielectric layers of the upper substrate and the lower substrate as a result. Also, in the cells selected by the address discharge, an alternating signal applied to the scan electrodes and the sustain electrodes creates a sustain discharge.

FIG. 1 shows a perspective view of a conventional AC PDP.

As described above, the PDP includes a scan electrode 4 and a sustain electrode 5. Disposed over a dielectric layer 2 and a protection film 3, the electrodes 4 and 5 are provided in parallel and form pairs with each other under a first glass substrate 1. A plurality of address electrodes 8 covered with an insulation layer 7 are installed on a second glass substrate 6. Barrier ribs 9 are formed in parallel with the address electrodes 8, on the insulation layer 7 between the address electrodes 8. Additionally, a phosphor 10 is formed on the surface of the insulation layer 7 between the barrier ribs 9. The first and second glass substrates 1 and 6, having a discharge space 11 between them, are provided facing each other so that the scan electrode 4 and the sustain electrode 5 may respectively cross the address electrode 8. The address electrode 8 and a discharge space 11 formed at an intersection of the scan electrode 4 and the sustain electrode 5 form a discharge cell 12.

FIG. 2 is a diagram illustrating the arrangement of electrodes in a conventional PDP. The discharge cell 12 shown in FIG. 2 corresponds to the discharge cell 12 shown in FIG. 1.

As shown, a conventional PDP electrode has an m×n matrix configuration, in which address electrodes $A_1$ to $A_m$ are arranged in the column direction. Scan electrodes $Y_1$ to $Y_n$ and sustain electrodes $X_1$ to $X_n$ are alternately arranged in the row direction. The scan electrodes will be noted as "Y electrodes" and the sustain electrodes as "X electrodes."

FIG. 3 is a diagram illustrating a driving waveform used in a conventional PDP. As the diagram illustrates, the conventional PDP driving method requires that each subfield have a reset interval, an address interval, and a sustain interval.

In the reset interval, wall charges that were formed by a previous sustain discharge are erased, and the states of the cells are reset in order to fluently perform a next address operation. A conventional reset interval includes an erase interval, a Y ramp rising interval, and a Y ramp falling interval.

In the erase interval, an erase ramp voltage that gradually rises from 0V to +Ve(V) is applied to the X electrode. This erases the wall charges between the X electrode and the Y electrode.

In the Y ramp rising interval, the address electrode and the X electrode are maintained at 0V, and a ramp voltage that gradually rises from a voltage of $V_1$ to a voltage of $V_2$ is applied to the Y electrode. $V_2$ is greater than a discharge firing voltage with respect to the X electrode at 0V, and $V_1$ is less than the discharge firing voltage with respect to the X electrode at 0V. While the ramp voltage rises, a first weak reset discharge occurs in all the discharge cells from the Y electrode to the address electrode and the X electrode.

In the Y ramp falling interval, a ramp voltage that gradually falls from a voltage of $V_1$ to a voltage of $V_3$ is applied to the Y electrode while the X electrode is maintained at a constant voltage of Ve. $V_3$ is greater than a discharge firing voltage with respect to the X electrode at Ve, and $V_1$ is less than the discharge firing voltage with respect to the X electrode at Ve. While this ramp voltage is falling, a second weak reset discharge occurs in all the discharge cells.

When the reset operations are finished, scan pulses are sequentially applied to the Y electrode, and the wall charges are accumulated on the cells to which address data is applied.

The sustain interval is a period for performing a discharge that displays images on the addressed cells. When the sustain interval starts, sustain pulses are alternately applied to the X and Y electrodes, a sustain discharge is performed, and images are displayed.

The conventional PDP driving method noted above performs the reset operation and the address operation irrespective of whether address data is provided in each subfield. Significant disadvantages associated with this approach are increased background brightness, degraded contrast, and increased power consumption. For example, a high-resolution PDP needs a plurality of scan electrodes and subfields. Consequently a PDP with a large display area increases the line capacitance for each line and also increases a scan bias voltage; both of which increase power consumption. The increase of power consumption causes other problems such as raising the temperature of a scan IC (integrated circuit) above normal operating limits. This also degrades picture quality.

A solution is needed that provides a PDP having decreased background brightness, decreased power consumption, and improved contrast.

SUMMARY OF THE INVENTION

Embodiments of the present invention reduce background brightness and increase contrast by controlling performance of a reset operation that occurs in the absence of address data.

Embodiments of present invention also reduce power consumption and reduce a temperature of a scan IC by preventing an address operation from occurring in the absence of address data.

For example, in one embodiment, a PDP driver having an address electrode, and a scan electrode and a sustain electrode arranged in pairs with the address electrode, includes a subfield data generator that generates subfield data from input image data. The PDP driver also includes an address data driver for applying to the address electrode a voltage that corresponds to the subfield data. Also included in the PDP driver is an address data determiner that detects a subfield which has no address data from among the subfield data, and outputs a control signal that controls a reset operation when the detected subfield is driven. The PDP driver further includes a scan/sustain pulse driver that applies to the scan electrode and the sustain electrode a voltage which corresponds to the control signal provided by the address data determiner.

In another embodiment, a PDP driver having an address electrode, and a scan electrode and a sustain electrode arranged in pairs with the address electrode, includes a subfield data generator that generates subfield data from input image data. The PDP driver also includes an address data driver that applies to the address electrode a voltage which corresponds to the subfield data. The PDP driver also includes an address data determiner that receives the subfield data to detect a subfield which has no address data, and outputs a control signal that eliminates the detected subfield and drives a next subfield. The PDP driver also includes a scan/sustain pulse driver that applies to the scan electrode and the sustain electrode a voltage which corresponds to the control signal provided by the address data determiner.

A method of driving a PDP is also disclosed. Illustratively, the method may include generating subfield data from input image data; detecting from among the subfield data; a subfield having no address data outputting a control signal so that a reset operation may be controlled when the detected subfield is driven; and applying to the scan electrode a voltage that corresponds to the control signal.

Another method of driving a PDP may include generating subfield data from input image data; detecting from among the subfield data a subfield having no address data; outputting a control signal that eliminates the detected subfield and drives a next subfield; and applying to the scan electrode a voltage that corresponds to the control signal.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Embodiments of the invention provide an improved plasma display panel (PDP) which has a decreased background illumination, decreased power consumption, and improved contrast. Illustratively, an improved PDP accepts input image data and outputs subfield data which is based on the inputted image data. Whenever a subfield has no address data, a control signal controls a reset operation at the time the detected subfield is driven. Alternatively, a control signal is issued that eliminates the empty subfield and drives a subsequent subfield that has address data.

As used herein, wall charges represent charges that form on a wall (e.g., a dielectric layer) of discharge cells near the electrodes and accumulate on the electrodes. Although described as “formed,” “charged,” or “accumulated” on the electrodes, the wall charges may not actually contact the electrodes. As used herein, a wall voltage indicates a potential difference formed on the wall of the discharge cells among wall charges of different intensity.

Figure 1:
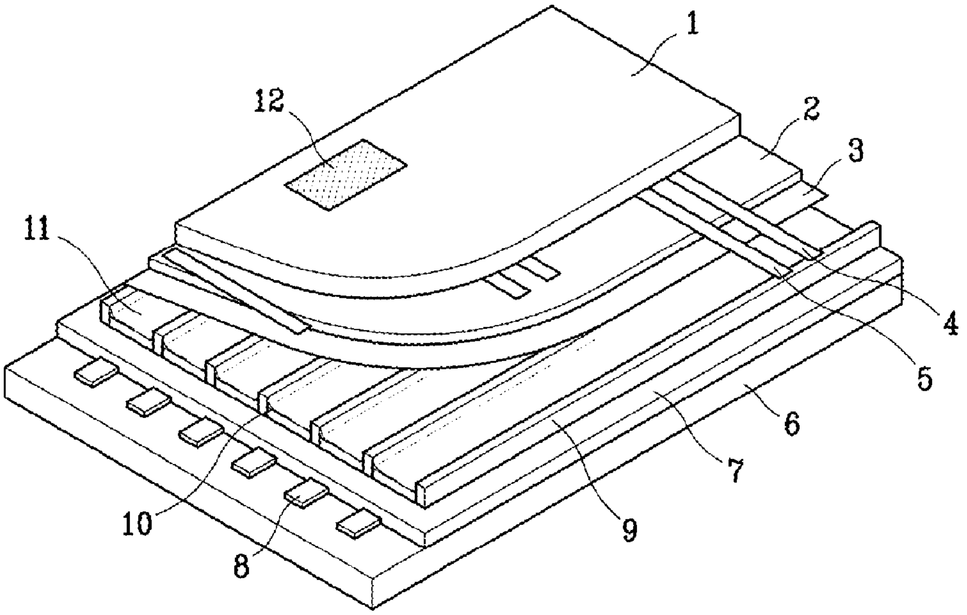
FIG. 1 (Prior Art)
FIG. 1 is a partial perspective view of an AC PDP.
Figure 2:
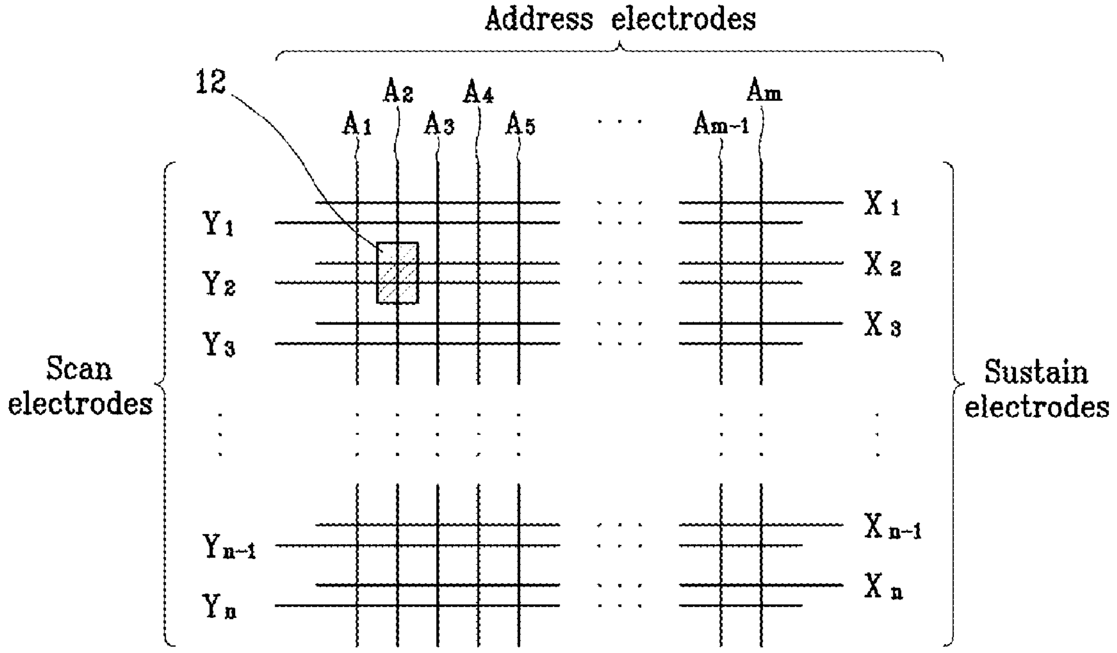
FIG. 2 (Prior Art)
FIG. 2 is a diagram illustrating an arrangement of electrodes in a conventional PDP.
Figure 3:
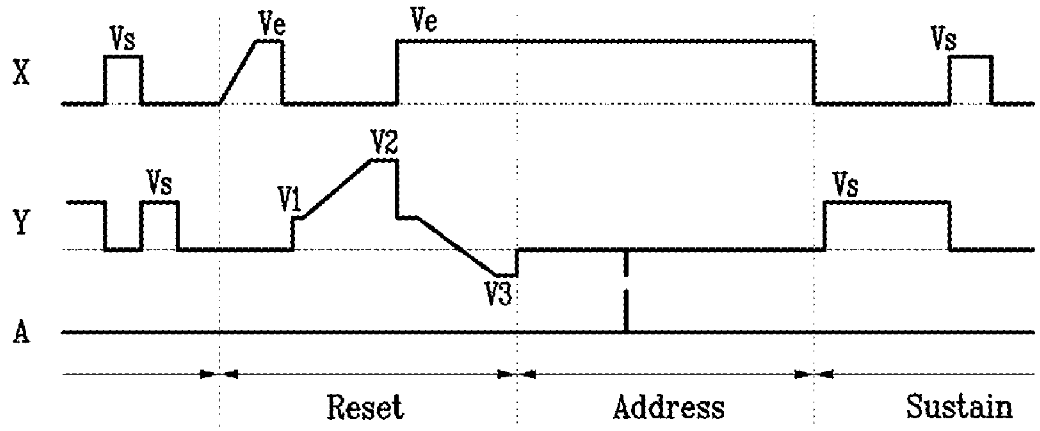
FIG. 3 (Prior Art)
FIG. 3 is a diagram that illustrates a waveform used to drive a conventional PDP.
Figure 4:
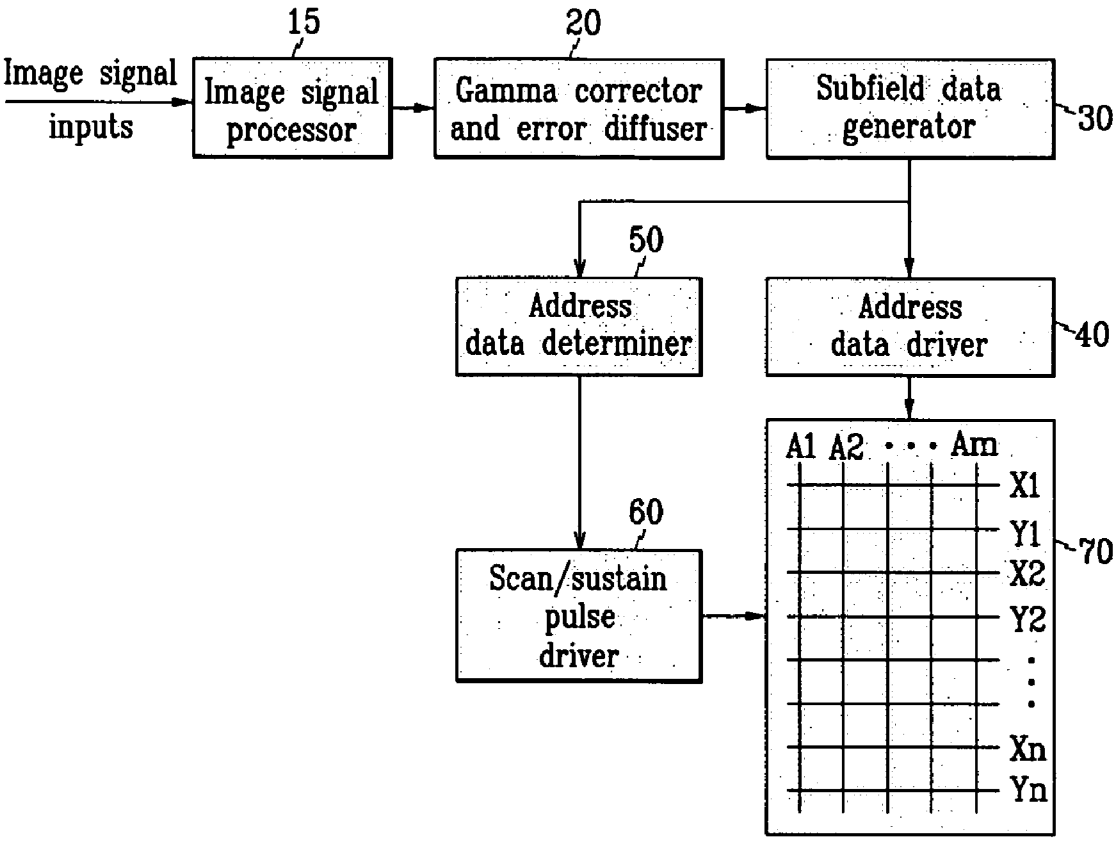
FIG. 4 is a block diagram of a PDP driver according to an exemplary embodiment of the present invention.

FIG. 4 is a block diagram of a PDP driver according to an exemplary embodiment of the present invention. As shown, a driver of the PDP 70 includes an image signal processor 15, a gamma corrector and error diffuser 20, a subfield data generator 30, an address data determiner 50, an address data driver 40, and a scan/sustain pulse driver 60.

In use, the image signal processor 15 processes external image signals into digital image data. The gamma corrector and error diffuser 20 receives the digital image data, and corrects gamma values according to the characteristics of the PDP 70. The gamma corrector and error diffuser 20 also diffuses display errors with respect to adjacent pixels, and outputs results. The subfield data generator 30 then generates subfield data from the digital image data, and outputs them. Thereafter, the address data driver 40 applies to address electrodes $A_1$ to $A_m$ a voltage that corresponds to the subfield data.

The address data determiner 50 receives the subfield data from the subfield data generator 30 and determines whether address data is provided to each respective subfield. If not, the address data determiner 50 controls a reset operation and/or a sustain operation for all subfields that are missing address data. Additionally, the address data determiner 50 may eliminate a corresponding subfield interval, and allow a next subfield interval to proceed.

The scan/sustain pulse driver 60 generates sustain pulses and scan pulses which correspond to the output signals of the address data determiner 50, and applies them to sustain electrodes $X_1$ to $X_n$ and scan electrodes $Y_1$ to $Y_n$, respectively.

In one embodiment the address data determiner 50 determines whether address data are provided in the respective subfields, and applies a control signal to the scan/sustain pulse driver 60 when no address data are provided therein. This control signal may suppress the reset operation and/or the address operation of the subfield, or eliminate the corresponding subfield entirely.

Figure 5A:
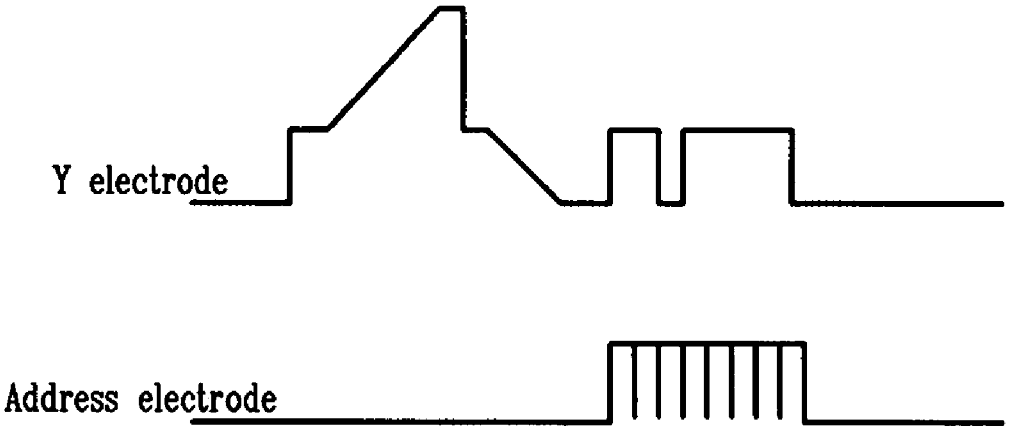
FIG. 5A is a diagram that illustrates an embodiment of a waveform that may be used to drive an embodiment of an improved PDP when address data is provided to a subfield.
Figure 5B:
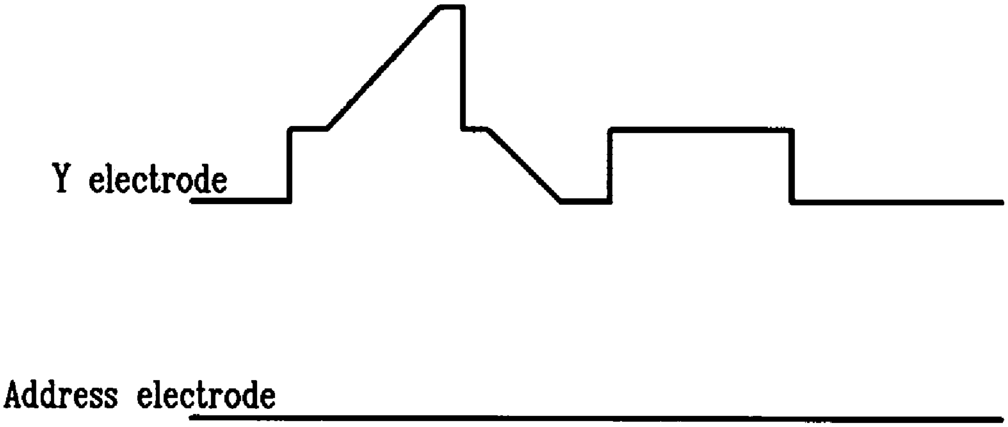
FIG. 5B is a diagram that illustrates an embodiment of a waveform that may be used to drive an embodiment of an improved PDP when no address data is provided to a subfield.

FIG. 5A is a diagram illustrating embodiments of a waveform that may be applied to the Y electrode according to a first exemplary embodiment of the present invention when address data is provided to a subfield. FIG. 5B is a diagram illustrating embodiments of a waveform that may be applied to the Y electrode according to a first exemplary embodiment of the present invention when no address data are provided to the subfield. Illustratively, when the address data is provided to a subfield the address operation is performed. However, when no address data is provided to the subfield, the address operation is suppressed by withholding the scan pulse.

In one embodiment, the address data determiner 50 receives information about the subfield data from the subfield data generator 30, and applies a control signal to the scan/sustain pulse driver 60 so that scan pulses are not applied during the address interval for subfields which are empty of address data. In this manner, the address operation is suppressed because the scan/sustain pulse driver 60 applies no scan pulse in the corresponding subfield according to the control signal output by the address data determiner 50. This reduces the power used to drive the PDP and also reduces the temperature of the scan/sustain pulse driver 60.

Figure 6:
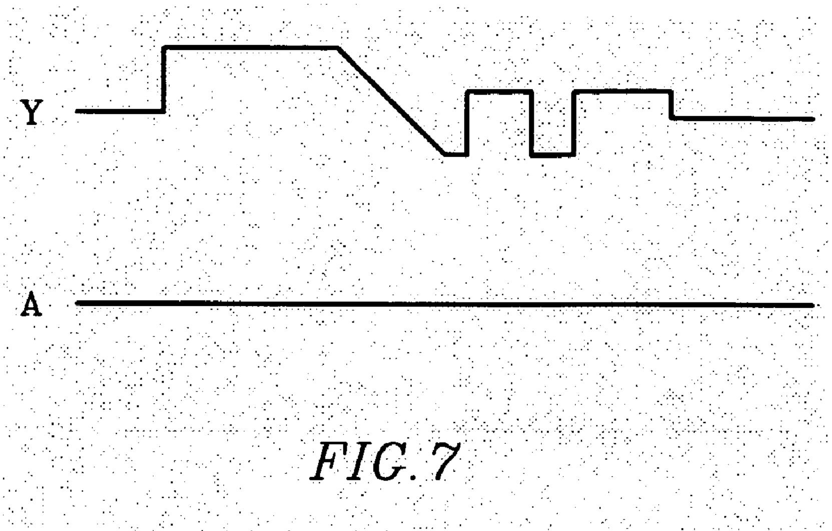
FIG. 6 is a diagram that illustrates another embodiment of a waveform that may be used to drive an improved PDP.
Figure 7:
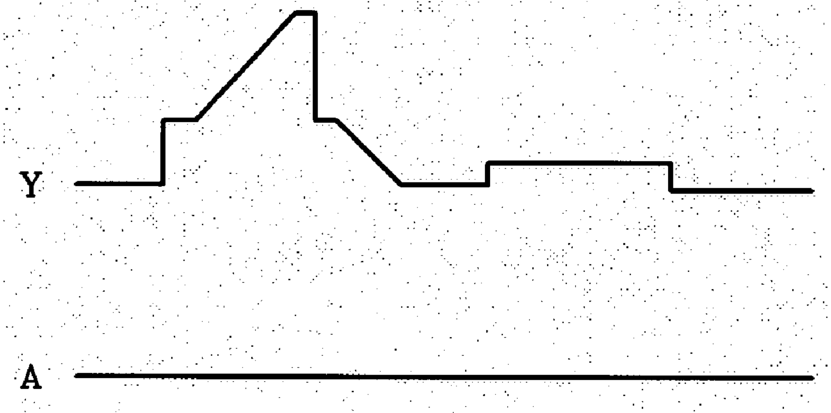
FIG. 7 is a diagram that illustrates another embodiment of a waveform that may be used to drive an improved PDP.
Figure 8:
FIG. 8 is a diagram that illustrates another embodiment of a waveform that may be used to drive an improved PDP.

FIGS. 6, 7, and 8 are diagrams illustrating various exemplary waveforms that may be used to control the reset operation of the Y electrode when no address data is provided in a subfield.

As shown in FIG. 6, the voltage applied to the Y electrode may be controlled in the Y ramp rising interval of the reset interval. Doing so not only controls the accumulation of wall charges, but also suppresses the weak reset discharge normally generated by the accumulated wall charges. As a result, the background brightness is reduced and the contrast is improved because the reset discharge is suppressed during the reset operation.

In FIG. 7, a rising ramp voltage applied to the Y electrode during the Y ramp rising interval is controlled during the Y ramp falling interval. Specifically, a falling voltage is controlled such that it gradually falls to the ground voltage level, and maintains the Y electrode at that level.

In this instance, no scan pulse should be applied to the Y electrode during the address period so that a discharge between the X and Y electrodes is not generated. Illustratively, negative charges are accumulated on the Y electrode, and positive charges are accumulated on the address electrode and the X electrodes, during the Y ramp rising interval. If a scan pulse is applied to the Y electrode when no falling ramp voltage is applied to the Y electrode, a discharge between the X and Y electrodes may occur due to a difference in voltage applied to the X and Y electrodes and a voltage formed by the wall charges. To prevent such a discharge from occurring, embodiments of the invention do not apply a scan pulse to the Y electrode during an address period that has no address data.

Therefore, in one embodiment, the address data determiner 50 applies a control signal to the scan/sustain pulse driver 60 so that no scan pulse is applied where voltage applied to the Y electrode is controlled during the Y ramp falling interval.

In one embodiment, weak reset discharge generated in the Y ramp falling interval is suppressed by controlling the operation of erasing the wall charges accumulated in the Y ramp rising interval. As mentioned previously controlling the address operation reduces power consumption and reduces the temperature of the scan/sustain pulse driver 60.

As shown in FIG. 8, the voltage applied to the Y electrode can be controlled in both the Y ramp rising interval and the Y ramp falling interval. In this embodiment, the operation of accumulating the wall charges in the reset interval and the operation of erasing them are suppressed. The reset discharge generated in the Y ramp rising interval and the Y ramp falling interval is also suppressed. Accordingly, the address operation is controlled so that the scan pulse is not applied to the Y electrode during these times.

As FIG. 8 illustrates, a suppressed rising ramp and a suppressed falling ramp voltage may be applied to the Y electrode. Additionally, a bias voltage may be applied to the Y electrode to float or maintain the Y electrode at the ground voltage level during a reset operation that corresponds to a subfield without address data.

As mentioned above, the address data determiner 50 may eliminate a subfield when the subfield has no address data. In this instance, the subfield without address data is removed, and a next subfield is driven so that an optical axis may be moved at the time of image realization and advantageously operated for contour noise. Thus, by controlling performance of the reset operation of the subfield without address data, the contrast of the PDP is improved.

Additionally, suppressing the address operation of each subfield without address data lowers the power consumption of the PDP and lowers the temperature of the scan IC.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A plasma display panel (PDP) driver for a PDP having an address electrode, and a scan electrode and a sustain electrode arranged in pairs with the address electrode, comprising:

a subfield data generator for generating subfield data from input image data, and outputting the subfield data;

an address data driver for applying a voltage which corresponds to the subfield data to the address electrode;

an address data determiner for detecting a subfield which has no address data from among the subfield data, and outputting a control signal so as to control a reset operation at the time of driving the detected subfield; and a scan/sustain pulse driver for applying a voltage which corresponds to the control signal provided by the address data determiner to the scan electrode and the sustain electrode, wherein the address data determiner outputs the control signal during a reset interval of the subfield without address data so that the scan/sustain pulse driver applies a first voltage level to the scan electrode to maintain the scan electrode at the first voltage level, and applies a falling ramp voltage to the scan electrode to gradually reduce the voltage to a second voltage level and maintain the second voltage level.

2. The PDP driver of claim 1, wherein the first voltage level is a positive voltage level, and the second voltage level is a negative voltage level.

3. The PDP driver of claim 1, wherein the scan/sustain pulse driver applies a constant voltage to the scan electrode during an address interval of the subfield without address data.

4. A plasma display panel (PDP) driver for a PDP having an address electrode, and a scan electrode and a sustain electrode arranged in pairs with the address electrode, comprising:

a subfield data generator for generating subfield data from input image data, and outputting the subfield data;

an address data driver for applying a voltage which corresponds to the subfield data to the address electrode;

an address data determiner for detecting a subfield which has no address data from among the subfield data, and outputting a control signal so as to control a reset operation at the time of driving the detected subfield; and a scan/sustain pulse driver for applying a voltage which corresponds to the control signal provided by the address data determiner to the scan electrode and the sustain electrode, wherein the address data determiner applies the control signal during a reset interval of the subfield without address data so that the scan/sustain pulse driver applies a rising ramp voltage to the scan electrode to gradually increase it to a first voltage level and maintain the scan electrode at the first voltage level, and applies a falling voltage to the scan electrode to gradually reduce it to a ground voltage level and maintain the scan electrode at the ground voltage level.

5. The PDP driver of claim 4, wherein the address data determiner outputs a control signal during an address interval of the subfield without address data so that the scan/sustain pulse driver may apply no scan pulse to the first electrode.

6. A plasma display panel (PDP) driver for a PDP having an address electrode, and a scan electrode and a sustain electrode arranged in pairs with the address electrode, comprising:

a subfield data generator for generating subfield data from input image data, and outputting the subfield data;

an address data driver for applying a voltage which corresponds to the subfield data to the address electrode;

an address data determiner for detecting a subfield which has no address data from among the subfield data, and outputting a control signal so as to control a reset operation at the time of driving the detected subfield; and a scan/sustain pulse driver for applying a voltage which corresponds to the control signal provided by the address data determiner to the scan electrode and the sustain electrode, wherein the address data determiner applies the control signal during a reset interval of the subfield without address data so that the scan/sustain pulse driver applies a first voltage level to the scan electrode to maintain the scan electrode at the first voltage level, and applies a falling voltage to the scan electrode to gradually reduce it to a ground voltage level and maintain the scan electrode at the ground voltage level.

7. The PDP driver of claim 6, wherein the address data determiner outputs a control signal during an address interval of the subfield without address data so that the scan/sustain pulse driver may apply no scan pulse to the first electrode.

8. The PDP driver of claim 6, wherein the address data determiner applies a control signal during a reset interval of the subfield without address data so that the scan/sustain pulse driver floats the scan electrode.

9. The PDP driver of claim 6, wherein the scan/sustain pulse driver maintains the scan electrode at a ground voltage level during an address interval of the subfield without address data.

10. The PDP driver of claim 6, wherein the scan/sustain pulse driver maintains the scan electrode at a bias voltage level during an address interval of the subfield without address data.

11. A method for driving a plasma display panel (PDP), the method comprising:

generating subfield data from input image data, and outputting the subfield data;

detecting a subfield without address data from among the subfield data;

outputting a control signal so that a reset operation is controlled at the time of driving the detected subfield; and applying a voltage corresponding to the control signal to a scan electrode, wherein applying a voltage comprises, during a reset interval of the detected subfield, applying a first voltage level to the scan electrode to maintain the scan electrode at the first voltage level, and applying a falling ramp voltage to the scan electrode to gradually reduce the voltage to a second voltage level and maintain the scan electrode at the second voltage level.

* * * * *